United States Patent [19]

Collins et al.

[11] 4,182,607
[45] Jan. 8, 1980

[54] PHOTOFLASH LAMP UNIT UTILIZING RADIATION AND VOLTAGE RESPONSIVE SWITCH DEVICES

[75] Inventors: Edward J. Collins, Mentor-on-the-Lake; Vaughn C. Sterling, Cleveland Heights, both of Ohio

[73] Assignee: General Electric Company, Schenectady, N.Y.

[21] Appl. No.: 856,273

[22] Filed: Dec. 1, 1977

[51] Int. Cl.² ............................................... F21K 5/02
[52] U.S. Cl. ...................................... 431/359; 362/11; 362/6; 362/15
[58] Field of Search ................. 431/359; 362/4, 6, 15, 362/11

[56] References Cited

U.S. PATENT DOCUMENTS

| | | | |
|---|---|---|---|
| 3,532,931 | 10/1970 | Cote et al. | 431/359 |
| 3,969,065 | 7/1976 | Smialek | 431/359 |
| 3,988,647 | 10/1976 | Boloh et al. | 431/359 |
| 3,990,832 | 11/1976 | Smialek et al. | 431/359 |
| 3,990,833 | 11/1976 | Holub et al. | 431/359 |
| 3,994,664 | 11/1976 | Cusano | 431/359 |
| 4,045,712 | 8/1977 | De Tommasi | 431/359 |
| 4,080,155 | 3/1978 | Sterling | 431/359 |
| 4,087,233 | 5/1978 | Shaffer | 431/359 |
| 4,118,758 | 10/1978 | Cusano et al. | 362/6 |

Primary Examiner—Carroll B. Dority, Jr.
Attorney, Agent, or Firm—John F. McDevitt; Lawrence R. Kempton

[57] ABSTRACT

A photoflash lamp unit is described having a plurality of flash lamps fired individually and in sequence to include a plurality of switching devices each connected in the electrical circuit so as to interrupt the circuit path to a lamp that is flashed in response to the radiation emitted therefrom but still provide a circuit path to other unflashed lamps in the electrical circuit. In this manner, the desired firing sequence can be carried out although a particular flash lamp in the electrical circuit fails to fire because of defects other than a before-flash shorted condition and a more reliable switching arrangement is thereby provided. The construction of said individual combined radiation and voltage responsive switch device comprises a mass of switch material connected in the electrical circuit across spaced apart electrical terminals and which is disposed to receive radiant energy emitted by an associated lamp primarily in a predetermined region of the switch body for thermochemical decomposition in said region. Another region in the mass of switch material is simultaneously converted to provide a low resistance path in the electrical circuit.

21 Claims, 5 Drawing Figures

PHOTOFLASH LAMP UNIT UTILIZING RADIATION AND VOLTAGE RESPONSIVE SWITCH DEVICES

BACKGROUND OF THE INVENTION

A plurality of solid state switching devices useful in multiple flash photo lamp units is described in U.S. Pat. No. 3,994,664, assigned to the assignee of the present invention, wherein a parallel electrical connection of either radiation responsive or voltage responsive switching devices serves to permit reliable sequential firing of the flash lamps connected in the electrical circuit. In the described arrangement, the desired sequential firing of the flash lamps is not aborted if a lamp becomes accidentally detached or otherwise becomes open circuited. A suitable radiation responsive switching element for use in said arrangement is disclosed in U.S. Pat. No. 3,990,833, also assigned to the present assignee, which is characterized as a high relative humidity resistant mass of a composition comprising a metallic silver source and a humidity resistant organic polymer binder, said silver source comprising silver oxide with a carbon containing silver salt. The separate voltage responsive switching elements for use in this manner are also characterized as a mass of switch material which can interconnect a pair of spaced apart electrical terminals and with said voltage responsive switching material including copper oxide dispersed in an organic polymer binder in order to facilitate an irreversible change in electrical resistance from a high resistance state to a low resistance state upon application of a voltage in excess of a selectable threshold voltage. Understandably, the separate response characteristic provided by these individual switching elements unduly complicates the electrical circuit providing said desired sequential firing operation.

CROSS-REFERENCE TO RELATED APPLICATION

A related high voltage type flash lamp unit is disclosed in copending patent application Ser. No. 856,274 filed concurrently herewith, in the name of Harihar D. Chevali et al, and assigned to the present assignee. In said high voltage flash lamp array, there is employed an improved solid state switching device in the form of a switch material which is both radiation responsive as well as voltage responsive in order to provide a more reliable switching operation. The present invention represents an improvement therefrom wherein a single mass of a similar switch material composition that includes a silver source along with a metal containing material is provided to be both radiation and voltage responsive but now exhibits a dissimilar switching mode of operation in the electrical circuit. Specifically, the switching device of the present invention undergoes sufficient thermochemical reaction when actuated by radiant energy from an adjacent flash lamp to vigorously decompose in only one region of the switch body receiving direct radiation from the actuating lamp and thereat produce an open circuit path in the electrical circuit. As distinct therefrom, the switch material composition in the related copending application is selected so as to continue to provide a low electrical resistance path in the electrical circuit after conversion by the radiant energy.

SUMMARY OF THE INVENTION

It has now been discovered, surprisingly, that a novel mode of switching operation is provided with a combination radiation and voltage responsive switch device being located adjacent a flash lamp in the flash lamp unit and which further utilizes a particular connection of said switching device in the electrical circuit. More particularly, said improved photoflash lamp unit comprises a pair of flash lamps, an electrical circuit into which said lamps are connected to fire individually and in sequence, and a combination radiation and voltage responsive switch device located external of the lamps and forming part of the electrical circuit, said switch device being located adjacent one of said lamps and disposed to directly receive radiant energy emitted by that lamp in only a first region of the switch body whereupon said first region undergoes thermal decomposition sufficient to interrupt the circuit path to the radiation actuating lamp while a second region of said switch device is not directly exposed to said radiant emission and remains connected in the electrical circuit to an unflashed lamp after undergoing only partial conversion to a low electrical resistance condition. Interruption of the circuit path to the radiation actuating lamp in such manner avoids disturbing the firing sequence of yet unflashed lamps if this flashed lamp develops a short circuit condition. If said associated lamp fails to flash due to high breakdown defects, however, the entirely unconverted switching device remains operative for actuation by the same or a succeeding voltage pulse. An applied voltage pulse operates to convert the second region of the switching device to a low electrical resistance path in the electrical circuit thereby enabling actuation of the next unflashed lamp.

A preferred embodiment of the present switching arrangement comprises an electrical circuit into which the flash lamps are connected to fire individually and in sequence, a plurality of flash lamps of the high voltage type which become open circuited when flashed and are connected in parallel branch circuits across the terminals of an energy source for high voltage pulses, a plurality of combination radiation and voltage responsive switch devices each serially connected to an associated flash lamp, each of said switch devices being located adjacent the associated lamp to receive direct radiant energy being emitted by that lamp in only a first region whereupon said first region undergoes thermochemical decomposition interrupting the circuit path to said radiation actuating lamp, and with each switch device being further connected in the electrical circuit by a common connection to other switch devices wherein said common connection is achieved in a second region of each switch device which undergoes less vigorous conversion and thereby provides a low electrical resistance path in the electrical circuit to the next unflashed lamp. In the preferred switching arrangement, continued sequential firing of the individual flash lamps takes place in the predetermined firing order despite a particular flash lamp failing to fire because of lamp defects producing an excessively high breakdown voltage condition in one or more of the branch circuits as well as development of a short circuit condition in an already flashed lamp. Only lamp defects resulting in a before-flash short circuit condition will interrupt the desired lamp firing sequence, therefore, since a lamp short circuit condition which develops when a lamp is flashed or thereafter does not prevent the firing sequence from taking place.

For proper switching action, as above defined, it is necessary for the switch material to undergo sufficiently vigorous thermochemical conversion upon actuation by the radiant energy to interrupt the circuit path between a pair of spaced apart electrical terminals connected to the first region of the switch body. The present switch device further includes additional electrical terminals connected to the second region of the switch body not directly exposed to radiation being emitted from the associated flash lamp. Selective radiation exposure of said first and second regions in the switch body is accomplished with cooperative aperture means more fully described hereinafter.

A generally useful switch material composition for practice of the present invention comprises an admixture of a metallic silver source having a sufficient amount of a metal containing material to convert the switch to a low electrical resistance path upon application of a high voltage pulse. Said switch material composition can further contain a humidity resistant organic polymer binder with selection of all said material constituents as well as the weight proportions in a specific material formulation being dictated by a further requirement to undergo sufficiently vigorous thermochemical conversion responsive to direct radiation exposure for interruption of the electrical circuit path in the predetermined first region. A suitable metallic silver source for use in this manner comprises silver oxide and a carbon containing silver salt whereas a suitable metal containing material for use can be selected from titanium metal and titanium hydride. A typical switch material composition as the final solid state switch element comprises in parts by weight about 13.4 parts silver oxide, about 53.6 parts silver carbonate, about 30 parts powdered titanium metal, and about 3 parts organic polymer binder.

DESCRIPTION OF THE PREFERRED EMBODIMENTS

Figure 1:
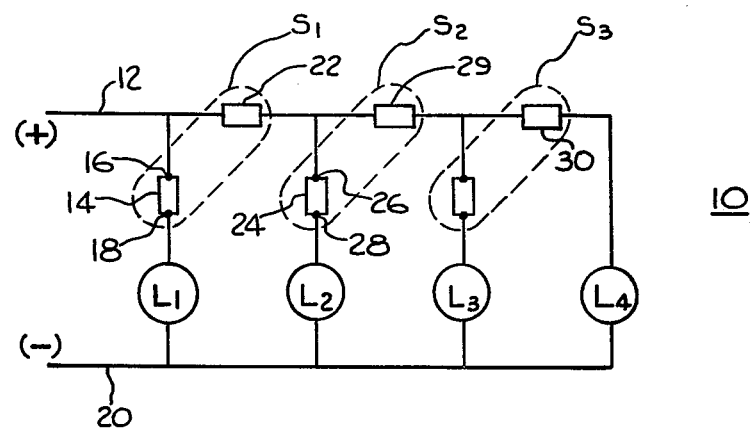
FIG. 1 is a schematic electrical diagram depicting flash lamp firing circuitry utilizing the present switching arrangement.

In FIG. 1, the schematic electrical diagram 10 includes a plurality of photoflash lamps $L_1$ through $L_4$ which are electrically connected in branch circuits across a source of high voltage pulse energy (not shown) in a known manner. A plurality of switch devices $S_1$ through $S_3$ is connected in said electrical circuit with each of the switch devices being connected in individual branch circuits by series connection to the flash lamp in said branch circuit as well as being further connected by series connection to common conductor 12 in the electrical circuit. The desired mode of operation in accordance with the present invention is carried out starting with the leftmost branch circuit when lamp $L_1$ in said circuit is flashed and causes a first region 14 in the switch body $S_1$ to undergo sufficient thermochemical decomposition for physical interruption of the circuit path to the radiation actuating lamp between a pair of spaced apart electrical terminals 16 and 18 which serially connect said region of switch $S_1$ to the actuating lamp. A second region 22 of switch $S_1$ receives less radiation when lamp $L_1$ is flashed and simultaneously undergoes less vigorous conversion to provide a low electrical resistance path to the next branch circuit. If lamp $L_1$ fails to flash, then the same or a succeeding high voltage pulse applied across the conductors 12 and 20 can convert said second region 22 of switch $S_1$ from a high electrical resistance condition to a low electrical resistance circuit path in order to apply said firing pulse to the next lamp $L_2$. The energy in said firing pulse is sufficient to further cause dielectric breakdown of a predetermined first region 24 in switch device $S_2$, which is serially connected in the second branch circuit across spaced apart electrical terminals 26 and 28, and thereby provide a low electrical resistance path to said lamp. Flashing of lamp $L_2$ causes thermal decomposition of first region 24 in switch $S_2$ for interruption of the circuit path to said actuating flash lamp in the second branch circuit while simultaneously converting a second region 29 with the same switch to an electrically conductive circuit path to the next unflashed lamp. As can be noted, only those regions 14 and 24 of switch devices $S_1$ and $S_2$, which are connected in the branch circuits and are further disposed adjacent the actuating flash lamps for direct exposure to the emitted light/heat radiation undergo thermal decomposition since conversion of the remaining regions 22 and 29, respectively, in said switch devices which remain connected to the source of high voltage energy and to still unflashed lamps simply produces a low electrical resistance path in the electrical circuit. Likewise, it will be apparent that conversion of the individual switches by lamp flashing or a high voltage pulse in this manner enables all lamps $L_1$ through $L_4$ to be flashed in the desired sequence. For this purpose, switch $S_3$ can be constructed so that region 30 exhibits a higher resistance value before conversion than predetermined lower resistance value switches $S_1$ and $S_2$.

Figure 2:
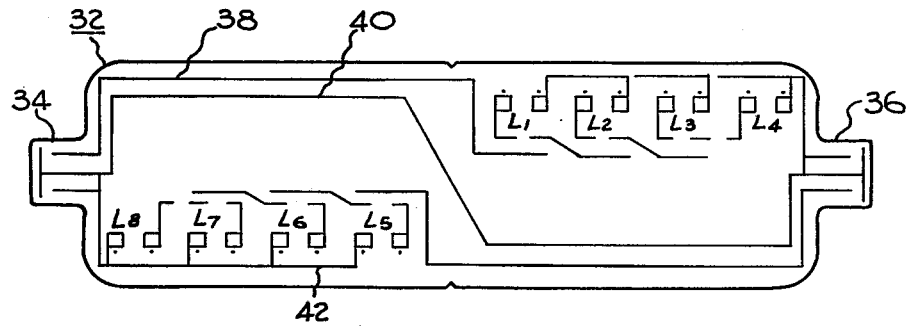
FIG. 2 is a top view of a circuit board member having patterned electrically conductive circuitry deposited thereon in accordance with a preferred embodiment of the present invention.
Figure 3:
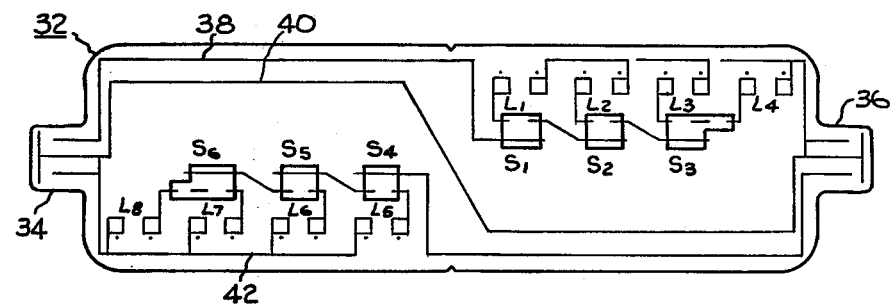
FIG. 3 represents the circuit board member shown in FIG. 2 wherein the solid state switching devices have been further deposited on the patterned circuitry in accordance with the present invention.

In FIGS. 2-3 there is shown a circuit board member 32 which is constructed in accordance with the electrical switching circuit described in FIG. 1 and further includes provision for selective exposure of the switching devices to radiation from associated flash lamps. Accordingly, said circuit board member 32 can have the same general structural configuration disclosed in the aforementioned related patent application Ser. No. 856,274 which includes connector tabs 34 and 36 located at each end for insertion of said circuit board member in an associated camera socket (not shown). The camera socket has contacts for conductor lines 38, 40, and 42 on the circuit board to connect four flash lamps $L_1$ through $L_4$ in parallel between conductor lines 38 and 40 when connector tab 34 has been inserted in the camera socket. Correspondingly, the remaining group of four lamps $L_5$ through $L_8$ is connected between conductor lines 40 and 42 when connector tab 36 has been inserted in the camera socket. Conductor lines 38 and 42 are interrupted by switching devices of the present invention $S_1$ through $S_3$ and $S_4$ through $S_6$, respectively, as can be better seen from reference to FIG. 3. The construction of said circuit board member 32 having the patterned electrical circuitry and switching devices shown in FIGS. 2–3 can be carried out on a suitable dielectric substrate, such as polystyrene, by conventional coating techniques and which can require presence of an organic diluent solvent. Useful solvents can be selected which are conventionally employed in silk screening or some other known form of printing method. Accordingly, a liquid dispersion of the electrically conductive circuitry formulation can be deposited and the liquid medium removed therefrom whereupon a liquid dispersion of the switch material composition can then be deposited in like manner on the circuitry pattern between the electrical terminals at the locations shown in FIGS. 2–3 to form the circuit switching arrangement above described.

Figure 4:
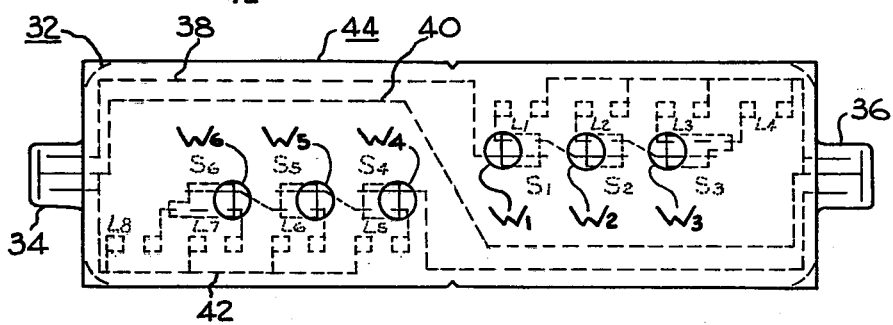
FIG. 4 is a top view depicting preferred structural means for directly exposing only a predetermined region of the switching devices shown in FIG. 3 to radiation emitted by associated flash lamps.
Figure 5:
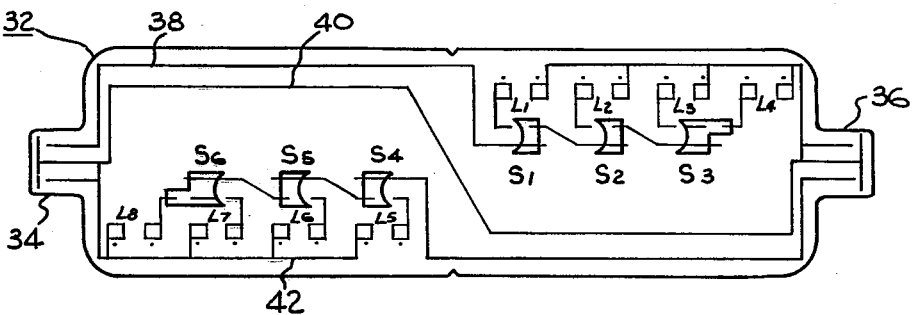
FIG. 5 depicts the circuit board member shown in FIG. 3 after all switch devices have been actuated by radiation from the associated flash lamps.

A top view is shown in FIG. 4 of said circuit board member 32 having the patterned electrically conductive circuitry deposited thereon along with switch devices $S_1$ through $S_6$ deposited on said circuitry as previously described in connection with FIGS. 2–3 and which further includes an overlying optically opaque sheet member 44 having openings $W_1$ through $W_6$ which are aligned in registry with predetermined first regions of the underlying switch devices. Said optically opaque sheet member 44 can be further contoured to serve other functions in the overall particular photoflash unit such as a support for the associated flash lamps, light reflector for said flash lamps, and the like. As can be noted, the aperture openings $W_1$ through $W_6$ in said sheet member 44 permit only said predetermined first region of each switch device located beneath to receive direct radiant energy being emitted from an associated flash lamp supported on said member. That region of each switching device adjoining the aperture opening and which is separately connected to remaining switching devices in the electrical circuit receives only indirect light and/or heat when the associated lamp is flashed. Upon flashing of the associated flash lamp, said first region of the switching device receiving direct radiation undergoes sufficient thermochemical decomposition to interrupt the circuit path to the radiation actuating lamp as better shown in the resultant circuit board embodiment depicted in FIG. 5. More particularly, the circuit board member 32 in FIG. 5 depicts the electrical circuit after all switches $S_1$ through $S_6$ have been successively actuated by the radiation emitted from the associated flash lamps in the proper sequential firing order. As shown, none of the lamps failed to flash due to internal defects or otherwise so that each switch device $S_1$ through $S_6$ has been converted by thermochemical decomposition to interrupt the circuit path to its associated radiation actuating lamp. The after-flash switch devices depicted in FIG. 5 represent the second regions in the switch material adjoining the aperture openings and which receive light and/or heat radiation only indirectly when the associated lamps are flashed for simultaneous conversion to low electrical resistance paths in the electrical circuit. As can be further noted, each switch device, $S_1$ through $S_6$ remains connected in the electrical circuit by a common connection to the remaining switch devices in each group of four flash lamps which are operatively connected at a given time to the source of high voltage firing pulses.

By such common connection between the second region of each switch device not receiving direct radiation from an adjacent flash lamp to said high voltage energy source it becomes further possible to actuate remaining unflashed lamps in the electrical circuit despite lamp defects which produce an excessively high breakdown voltage condition in one or more lamps. The above described interconnection between the individual switch devices enables dielectric breakdown of the switch devices responsive to an applied high voltage pulse thereby providing a low resistance electrical circuit path to other nondefective unflashed lamps so long as no before-flash short circuit lamp defects are encountered. Thus, successive conversion of the switch devices in this alternate manner serves as a means of sequentially firing the remaining unflashed lamps in the connected lamp group. The open circuit paths in the FIG. 5 circuit arrangement as represented by absence of switch material bridging the spaced apart electrical terminals interconnecting each switch device to its radiation actuating flash lamp serves to preclude any application of a succeeding high voltage pulse to an already flashed lamp.

It will be evident from the foregoing description that various modifications can be made in the furnished embodiments without departing from the spirit and scope of the present invention. For example, an additional switching device could be interconnected to the fourth lamp in a four-lamp group as above described in order to provide still greater reliability in achieving the desired lamp firing sequence. Accordingly, it is intended to limit the present invention only by the scope of the following claims.

What we claim as new and desire to secure by United States Letters Patent is:

1. A photoflash lamp unit for sequential firing of associated flash lamps which comprises:
    (a) a pair of flash lamps,
    (b) an electrical circuit into which said lamps are connected to fire individually and in sequence, and
    (c) a combination radiation and voltage responsive switch device located external of the lamps and forming part of the electrical circuit, said switching device being in the form of a material admixture which undergoes both thermochemical decomposition upon radiant energy exposure and undergoes dielectric breakdown from a high resistance condition to a low resistance condition when a high voltage pulse is applied, said switch device being located adjacent one of said lamps and disposed to receive direct radiant energy emitted by that lamp at only a first region, said direct radiant energy being transmitted through cooperative aperture means spaced between said adjacent flash lamp and said switching device, whereupon said first region undergoes thermochemical decomposition sufficient to interrupt the circuit path to the radiation actuating lamp while a second region of said switch device not directly receiving radiant energy through said cooperative aperture means remains connected in the electrical circuit to the unflashed lamp.

2. A photoflash lamp unit as in claim 1 wherein the switch device is a mass of switch material connected in the electrical circuit to the actuating flash lamp by interconnection at said first region to a pair of spaced apart electrical terminals.

3. A photoflash lamp unit as in claim 2 wherein the switch device further includes electrical terminals connected at said second region to a source of high voltage pulses and to the unflashed lamp.

4. A photoflash lamp unit as in claim 1 wherein the electrical circuit comprises a circuit board member having patterned electrically conductive circuitry deposited thereon and wherein the switch device is deposited on said circuitry.

5. A photoflash lamp unit as in claim 4 wherein the flash lamps are physically supported by said circuit board member.

6. A photoflash lamp unit as in claim 4 wherein the switch device is a mass of switch material connected in the patterned circuitry to the radiation actuating flash lamp by interconnection at said first region to a pair of spaced apart electrical terminals.

7. A photoflash lamp unit as in claim 6 wherein the switch device further includes electrical terminals connected at said second region to a source of high voltage energy and to the unflashed lamp.

8. A photoflash lamp unit as in claim 1 wherein said switch comprises an admixture of a metallic silver source with a sufficient amount of a metal containing material to convert the switch to said low electrical resistance path upon application of a high voltage pulse.

9. A photoflash lamp unit as in claim 8 wherein said admixture further includes a humidity resistant organic polymer binder.

10. A photoflash lamp unit as in claim 8 wherein the metallic silver source comprises silver oxide and a carbon containing silver salt.

11. A photoflash lamp unit as in claim 8 wherein the metal containing material is titanium metal.

12. A photoflash lamp unit for sequential firing of associated flash lamps which comprises:
 (a) an electrical circuit into which said lamps are connected to fire individually and in sequence,
 (b) a plurality of flash lamps connected in parallel branch circuits across the terminals of an energy source for a high voltage pulse,
 (c) a plurality of combination radiation and voltage responsive switch devices each connected between said individual branch circuits at a first region by series connection to interrupt the circuit path to the flash lamp in said branch circuit after said flash lamp has been flashed, each of said switching devices being in the form of a material admixture which undergoes both thermochemical decomposition upon radiant energy exposure and undergoes dielectric breakdown from a high resistance condition to a low resistance condition when a high voltage pulse is applied, each of said switch devices being located adjacent the flash lamp in the branch circuit to receive direct radiant energy being emitted by that lamp at only said first region, said direct radiant energy being transmitted through cooperative aperture means spaced between said adjacent flash lamp and said switching devices, whereupon said region undergoes sufficient thermochemical decomposition to interrupt the circuit path to said radiation actuating lamp, and
 (d) each switch device being further connected in the electrical circuit by a common connection to other switch devices wherein said common connection is achieved in a second region of each switch device receiving only indirect radiant energy for simultaneous conversion from a high electrical resistance to a low electrical resistance circuit path.

13. A photoflash unit as in claim 12 wherein the electrical circuit comprises a circuit board member having patterned electrically conductive circuitry deposited thereon and where the switch devices are deposited on said circuitry.

14. A photoflash unit as in claim 12 wherein the flash lamps are physically supported on said circuit board member.

15. A photoflash unit as in claim 13 wherein the cooperative aperture means for providing radiant energy to the flash lamps in only a predetermined region comprises an opaque sheet member interposed between the circuit board member and associated flash lamps having openings which expose only said first region of each switch device to the radiant energy being emitted by its radiation actuating lamp.

16. A photoflash unit as in claim 12 wherein each switch device is a mass of switch material connected in the patterned circuitry to the radiation actuating lamp by interconnection at said first region to a pair of spaced apart electrical terminals.

17. A photoflash unit as in claim 16 wherein the switch devices further include electrical terminals connected at said second regions to the source for a high voltage pulse and to the unflashed lamps.

18. A photoflash unit as in claim 12 wherein said switch devices comprise an admixture of a metallic silver source with a sufficient amount of a metal containing material to convert the switch to said low electrical resistance path upon application of a high voltage pulse.

19. A photoflash unit as in claim 18 wherein said admixture further includes a humidity resistant organic polymer binder.

20. A photoflash unit as in claim 18 wherein the metallic silver source comprises silver oxide and a carbon containing silver salt.

21. A photoflash unit as in claim 18 wherein the metal containing material is titanium metal.

* * * * *